United States Patent
Meinen

(10) Patent No.: US 6,644,109 B2
(45) Date of Patent: Nov. 11, 2003

(54) METHOD FOR CORRECTING LATERAL FORCE MEASURING VALUES

(75) Inventor: Michael Meinen, Nordstemmen (DE)

(73) Assignee: Seichter GmbH, Hannover (DE)

( * ) Notice: Subject to any disclaimer, the term of this patent is extended or adjusted under 35 U.S.C. 154(b) by 0 days.

(21) Appl. No.: 10/365,799

(22) Filed: Feb. 13, 2003

(65) Prior Publication Data

US 2003/0154778 A1 Aug. 21, 2003

(51) Int. Cl.[7] .............................................. G01M 17/02
(52) U.S. Cl. ......................................................... 73/146
(58) Field of Search ........................ 73/146, 1.08, 1.13, 73/1.15, 8

(56) References Cited

U.S. PATENT DOCUMENTS

| | | | |
|---|---|---|---|
| 4,404,848 A | 9/1983 | Iwama et al. | |
| 5,614,676 A | 3/1997 | Dutt et al. | |
| 5,645,465 A | * 7/1997 | Vannan, III | 451/5 |
| 6,386,945 B1 | * 5/2002 | Fahringer et al. | 451/5 |

FOREIGN PATENT DOCUMENTS

| | | |
|---|---|---|
| DE | 39 22 288 | 4/1997 |
| DE | 197 34 904 | 9/1999 |
| EP | 1 134 573 | 9/2001 |

* cited by examiner

Primary Examiner—Edward Lefkowitz
Assistant Examiner—Jermaine Jenkins
(74) Attorney, Agent, or Firm—Collard & Roe, P.C.

(57) ABSTRACT

A method for correcting lateral force measuring values for determining the cone effect of a vehicle tire is accomplished by recording with sensors lateral forces and radial forces at top and bottom clamping locations of a vertical axle of rotation of a load wheel of vehicle tire test equipment. In this method, the load wheel is eccentrically subjected to a force at least once, and the lateral forces and radial forces acting on the upper and lower clamping locations of the rotary axle of the load wheel are recorded both in a position where force is introduced at or near a line of contact between the load wheel and a vehicle tire, and in a position which is opposite in relation to the rotary axis of the load wheel. From the differences of the recorded upper and lower lateral forces and radial forces, a correction quantity is derived with which the lateral force measuring values are corrected depending on the radial force measuring values during subsequent tire tests.

4 Claims, 1 Drawing Sheet

METHOD FOR CORRECTING LATERAL FORCE MEASURING VALUES

BACKGROUND OF THE INVENTION

1. Field of the Invention

The invention relates to a method for correcting lateral force measuring values for determining the cone effect of a vehicle tire.

2. The Prior Art

After production, vehicle tires are subjected to a multitude of tests in order to ensure that minimum tolerances are met, and furthermore, in the case of those vehicle tires which do meet these minimum tolerances, to enable allocation to quality classes. One of these tests consists of determining a cone effect. A cone effect occurs in the case of conically produced vehicle tires or in the case of uneven spring constants. It causes lateral force to be exerted between the rolling vehicle tire and the roadway surface.

In vehicle tire test equipment, the roadway surface is simulated by a load wheel against which surface area a vehicle tire which has been subjected to extension is pressed. The lateral force can be determined by way of measuring sensors which are arranged at the clamping locations of the axle of the load wheel. The cone effect is determined by taking an average value of a lateral force for right-hand rotation and an average value of a lateral force for left-hand rotation of the vehicle tire and dividing the sum of the two lateral forces by two. Normally, these measurements are carried out in one of the two possible alignments in which the marking that comprises the characteristic data of the vehicle tires (called DOT) points upward or downward.

It has been shown that after turning the vehicle tire, i.e. with the marking pointing downward when before it was pointing upward, or vice versa, and after the measurement is repeated, a different cone effect is determined. The same value but with changed preceding signs should be obtained. Furthermore, it has been shown that different values of the cone effect also occur if the vehicle tire establishes contact, laterally offset, at another position of the surface area of the load wheel. The deviations which have been determined are generated by the vehicle tire test equipment itself. They necessitate a correction in order to reproduce the measuring values and allow a comparison of different tires, and of tires tested on different test equipment.

SUMMARY OF THE INVENTION

It is an object of the invention to provide a method for correcting lateral force measuring values, and enable reliable correction irrespective of the location where a vehicle tire contacts the load wheel.

The invention is based on the recognition that incorrect measuring values of the lateral forces picked up by the measuring sensors are triggered by radial forces which arise at the measuring sensor due to a non-ideal separation into force components. In addition, these radial forces can comprise differences between the upper and the lower measuring sensor. This phenomenon is also known as cross-talk.

This influence can be determined by determining in advance the different influences on the measuring sensors of the lower and the upper clamping of the rotary axle of the load wheel. A moment of tilt is exerted on the axle of the load wheel in the direction of the operational radial load in two opposite directions. During this time, the cross-talk of the measuring sensors for lateral forces is determined. The moment of tilt is exerted by applying an eccentric axial force on the load wheel, e.g. by applying a weight, and by subsequently carrying out two readings.

In the first reading, the force acts near the tangent with the vehicle tire, i.e. on the front as viewed by the operator. In the second reading, the force acts on the opposite side, i.e. on the rear as viewed by the operator. Subsequently, correction values are determined from the difference between the two readings. In subsequent readings, these correction values are used to correct the lateral forces measured. The corrected lateral force measuring values can then be used to determine the results of the cone effect which are reproducible and comparable, with the influences of the tire test equipment having been eliminated from these results.

Several steps are carried out during complete correction. In a first step, a cross-talk quantity of radial forces acting on the measuring sensors for lateral forces is determined according to the equation:

$$Rad_1' = \left( \frac{Lat_{1,front} - Lat_{2,rear}}{Rad_{1,front} - Rad_{1,rear}} - \frac{Lat_{2,front} - Lat_{2,rear}}{Rad_{2,front} - Rad_{2,rear}} \right) * S_1$$

wherein $Rad_1'$ denotes the upper cross talk quantity;

$Lat_{1,front}$ denotes the upper lateral force when the force is introduced from the front;

$Lat_{1,rear}$ denotes the upper lateral force when the force is introduced from the rear;

$Lat_{2,front}$ denotes the lower lateral force when the force is introduced from the front;

$Lat_{2,rear}$ denotes the lower lateral force when the force is introduced from the rear;

$Rad_{1,front}$ denotes the upper radial force when the force is introduced from the front;

$Rad_{1,rear}$ denotes the upper radial force when the force is introduced from the rear;

$Rad_{2,front}$ denotes the lower radial force when the force is introduced from the front;

$Rad_{2,rear}$ denotes the lower radial force when the force is introduced from the rear; and $S_1$ denotes a scale factor.

In a second step, a cone error of a vehicle tire at a specified load is determined according to the equation:

$$K = \frac{CONY_{DOT} + CONY_{NDOT}}{LOAD_{DOT} + LOAD_{NDOT}} * S_2$$

wherein

K denotes an equipment-dependent cone error;

$CONY_{DOT}$ denotes a cone effect when DOT is at the top;

$CONY_{NDOT}$ denotes a cone effect when DOT is at the bottom;

$LOAD_{DOT}$ denotes a radial load through the vehicle tire when DOT is at the top;

$LOAD_{NDOT}$ denotes a radial load through the vehicle tire when DOT is at the bottom; and $S_2$ denotes a scale factor.

In a third step, complete correction values $Rad_1 = Rad_1' + K/2$ and $Rad_2 = -Rad_1' + K/2$ are determined from the cross-talk quantity $Rad_1'$ and the cone error K. These correction values are used to correct the lateral force measuring values of the upper and lower measuring sensor. This is carried out according to the general equation:

Lat=Lat'₁+Lat'₂ with Lat'$_x$=Lat$_x$+Rad$_x$'*Rad$_x$, wherein

Lat'$_x$ denotes the corrected measuring value;

Lat$_x$ denotes the measuring value of the lateral force sensor;

Rad$_x$' denotes the cross-talk quantity, radial to lateral;

Rad$_x$ denotes the measuring value of the radial force sensor;

Lat: denotes the resulting lateral force.

The final equation is as follows:

Lat=Lat₁−Rad₁'*Rad₁/S₁+Lat₂−Rad₂'*Rad₂/S₁

Lat=Lat₁+Lat₂−(Rad₁'*Rad₁+Rad₂'*Rad₂)/S₁

The result of the first step provides a measure for the difference between the upper and the lower measuring sensor. This value does not depend on radial forces acting on the load wheel and can thus be taken over into the memory of a connected computer and can be used for further readings during vehicle tire tests. In the second step, from the cone effect and the load of the vehicle tire pressing against the load wheel, the equipment-dependent cone error is determined from the cone effects at the marking top and bottom in relation to the load. The sum of the cross talk and of the cone error, as determined in the third step, provides a correction value by which the measured lateral force has to be corrected in order to eliminate the equipment-dependent cone error.

If these corrected values are now used for the lateral force instead of the measured values, then the values of the cone effect are identical, irrespective of whether the vehicle tire was measured with the marking at the top or at the bottom and irrespective of the location at which the tire rolls on the surface area of the load wheel.

According to an improvement, the cross-talk quantity of radial forces acting on the measuring sensor for lateral forces is determined at specified intervals and/or is determined anew after maintenance and retooling work. It is possible that as time goes by or during maintenance and retooling work, clamping of the axle of the load wheel or the alignment of the measuring sensors changes slightly, resulting in a change of cross-talk behavior. By way of renewed determination, such changes can be eliminated and it can be ensured that the test equipment always returns reproducible results. Furthermore, the measuring values of the measuring sensors for the radial and lateral forces on the top and bottom clamping of the rotary axle of the load wheel are recorded and processed separately, and summation of the lateral forces is undertaken only after correction of the lateral forces. Based on such separate processing, the influences of cross-talk on the individual measuring sensors can be selected and the required correction values can be obtained.

BRIEF DESCRIPTION OF THE DRAWINGS

Other objects and features of the present invention will become apparent from the following detailed description considered in connection with the accompanying drawing. It is to be understood, however, that the drawing is designed as an illustration only and not as a definition of the limits of the invention.

DETAILED DESCRIPTION OF THE PREFERRED EMBODIMENT

Figure 1:
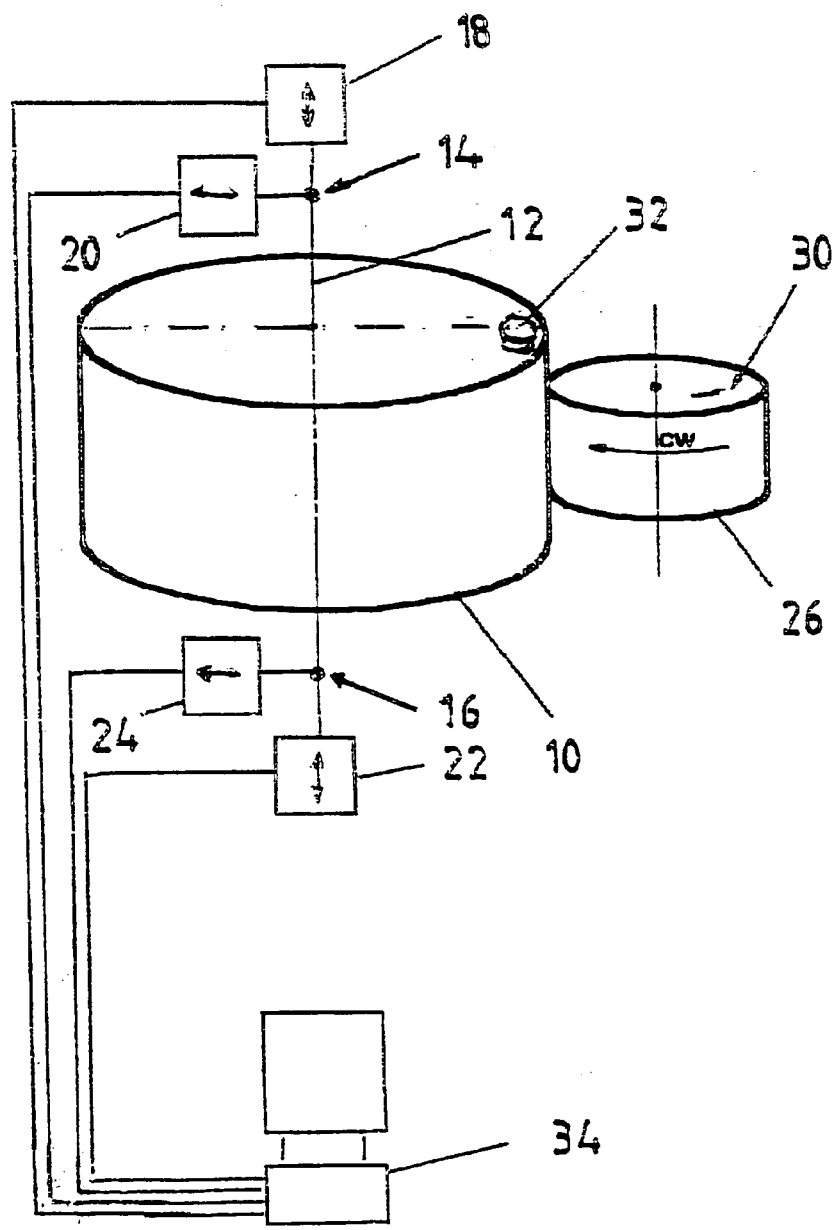
FIG. 1 shows a diagrammatic representation of tire test equipment according to the invention.

The drawing shows a diagrammatic representation of tire test equipment with a load wheel 10 which is clamped at the top and at the bottom via its perpendicular rotary axle 12. On the top and bottom clamping locations 14, 16 there are measuring sensors: at the top a measuring sensor 18 for lateral forces, a measuring sensor 20 for radial forces in the direction of the impressed load by a vehicle tire to be tested, and at the bottom clamping position 16 there is also a measuring sensor 22 for lateral forces and a measuring sensor 24 for radial forces. Preferably, the measuring sensors 18, 20, 22, 24 are extensometers, with signal lines leading to a computer 34. In this computer 34, the four signals of the measuring sensors 18, 20, 22, 24 are evaluated and corrected. A vehicle tire 26 to be tested is arranged parallel to the axis of the load wheel 10, said vehicle tire being clamped in a wheel rim arrangement and being rotatable via the wheel rim arrangement by means of a drive. The vehicle tire 26 can be pressed against the load wheel 10 at a load which approximately corresponds to the load which will be exerted during subsequent driving operation.

In a first step, in order to determine the cross-talk quantity, a weight 32 is eccentrically applied at the top on the load wheel 10, and static measuring values are determined by the vehicle tire to be tested, at first without a load. The first measuring value series is determined when the load wheel 10 with the weight 32 is in a position which is adjacent to the tangent of the load wheel 10 to the vehicle tire 26 to be tested during the tire test. In this arrangement, the weight 32 is on a straight connection between the axis 12 of the load wheel 10 and the tangent. After this, the load wheel 10 is rotated by 180 so that the weight 32 is aligned in the opposite position. Subsequently, a new series of measuring values is determined. In one measuring example, a weight was used which exerted a force of 100 N. In the front position, i.e. in the position adjacent to the tangent, the following values were measured: Rad₁=−6477, Lat₁=−101168, Rad₂=+8218, Lat₂=+28398. In the rear position, i.e. the opposite position, the following values were determined: Rad₁=+7020, Lat₁=−101816, Rad₂=−5284, Lat₂=+29055. Inserted into the equation $$Rad'_1 = \left( \frac{Lat_{1,front} - Lat_{2,rear}}{Rad_{1,front} - Rad_{1,rear}} - \frac{Lat_{2,front} - Lat_{2,rear}}{Rad_{2,front} - Rad_{2,rear}} \right) * S_1$$

with a scale factor S₁=40000, a cross-talk quantity of 25 for Rad₁ and of −25 for Rad₂ results. These values are stored for the subsequent tire tests.

In a subsequent measurement on a tire, at a load of 4000 N, a cone effect of 50 with DOT at the top, and a cone effect of −64 with DOT at the bottom were measured. Inserted into the equation determining the cone error at a scale factor S₂=160000, a value of −280 results. After taking into account the cross-talk quantity, this results in a correction of the cone error for Rad₁ of −255 and Rad₂ of −305.

If the measured values of the lateral forces are now corrected by the complete correction values according to the equation applied in the third step, then both measurements at DOT$_{top}$ and DOT$_{bottom}$ produce the same results, in the present case these are 57 and −57.

Accordingly, while only a single embodiment of the present invention has been shown and described, it is obvious that many changes and modifications may be made thereunto without departing from the spirit and scope of the invention.

What is claimed is:

1. A method for correcting lateral force measuring values to determine the cone effect of a vehicle tire (26), comprising:

subjecting a load wheel (10) of vehicle tire test equipment to an eccentric force at least once;

recording lateral forces and radial forces acting on upper and lower clamping locations (14, 16) of a rotary axis (12) of the load wheel (10) with measuring sensors (18, 20, 22, 24), both in a position where force is introduced at or near a line of contact between the load wheel (10) and the vehicle tire (26), and in an opposite position relative to the rotary axis (12) of the load wheel (10);

deriving a correction quantity from differences between the recorded upper and lower lateral forces and radial forces; and correcting the lateral force measuring values depending on radial force measuring values during subsequent tire tests using said correction quantity.

2. The method according to claim 1, wherein said step of deriving a correction quantity comprises a first step of determining a cross-talk quantity based on radial forces acting on the measuring sensors according to the equation:

$$Rad'_1 = \left( \frac{Lat_{1,front} - Lat_{2,rear}}{Rad_{1,front} - Rad_{1,rear}} - \frac{Lat_{2,front} - Lat_{2,rear}}{Rad_{2,front} - Rad_{2,rear}} \right) * S_1$$

wherein $Rad_1'$ denotes an upper cross-talk quantity;

$Lat_{1,front}$ denotes an upper lateral force when the force is introduced from the front;

$Lat_{1,rear}$ denotes an upper lateral force when the force is introduced from the rear;

$Lat_{2,front}$ denotes a lower lateral force when the force is introduced from the front;

$Lat_{2,rear}$ denotes a lower lateral force when the force is introduced from the rear;

$Rad_{1,front}$ denotes a upper radial force when the force is introduced from the front;

$Rad_{1,rear}$ denotes a upper radial force when the force is introduced from the rear;

$Rad_{2,front}$ denotes a lower radial force when the force is introduced from the front;

$Rad_{2,rear}$ denotes a lower radial force when the force is introduced from the rear; and $S_1$ denotes a scale factor;

and in a second step, a cone error of the vehicle tire at a specified load is determined according to the equation:

$$K = \frac{CONY_{DOT} + CONY_{NDOT}}{LOAD_{DOT} + LOAD_{NDOT}} * S_2$$

wherein

K denotes an equipment-dependent cone error;

$CONY_{DOT}$ denotes a cone effect when DOT is at the top;

$CONY_{NDOT}$ denotes a cone effect when DOT is at the bottom;

$LOAD_{DOT}$ denotes a radial load through the vehicle tire when DOT is at the top;

$LOAD_{NDOT}$ denotes a radial load through the vehicle tire when DOT is at the bottom; and $S_2$ denotes a scale factor;

and in a third step complete correction values $Rad_1 = Rad_1' + K/2$ and $Rad_2 = -Rad_1' + K/2$ are determined from the cross-talk quantity $Rad_1'$ and the cone error K, with said complete correction values being used to correct the lateral force measuring values of the upper and lower measuring sensor.

3. The method according to claim 2, wherein the cross-talk quantity is determined at specified intervals or is determined anew after maintenance and retooling work.

4. The method according to claim 1, wherein the values recorded by the measuring sensors for the radial and lateral forces on the upper and lower clamping locations of the rotary axis of the load wheel are recorded and processed separately, and wherein summation of the lateral forces is undertaken only after correction.

\* \* \* \* \*

UNITED STATES PATENT AND TRADEMARK OFFICE
CERTIFICATE OF CORRECTION

PATENT NO.     : 6,644,109 B2
DATED          : November 11, 2003
INVENTOR(S)    : Meinen It is certified that error appears in the above-identified patent and that said Letters Patent is hereby corrected as shown below:

<u>Title page,</u>
Item [30], Foreign Application Priority Data should read
-- Feb. 15, 2002 (DE)......................10206259.5 --.

Signed and Sealed this

Eighteenth Day of May, 2004

JON W. DUDAS
*Acting Director of the United States Patent and Trademark Office*